Patented Oct. 28, 1930

1,780,122

UNITED STATES PATENT OFFICE

BENJAMIN B. FELIX, OF CHICAGO, ILLINOIS, ASSIGNOR TO FEATHEREDGE RUBBER COMPANY, INC., A CORPORATION OF ILLINOIS

CONTINUOUS PROCESS OF PRODUCING SPONGE-RUBBER ARTICLES

No Drawing.    Application filed September 5, 1928.    Serial No. 304,164.

In Wedlock Patent No. 1,629,013, dated May 17, 1927, there is described a process whereby continuous articles of sponge rubber can be formed by enclosing sponge rubber compound in a flexible medium and drawing such enclosure and the compound within it through a heated die.

I have found that in some instances highly beneficial results can be obtained by incorporating a drawing member directly into the compound. Thus a piece of cord, preferably with a fairly rough surface, may be imbedded in the compound and then a strain exerted on the cord to draw the compound through the heated die. If desired, the cord may be knotted at the points to give better adhesion for the rubber. The die in which the rubber is cured may either have a highly polished surface so that the rubber will not stick to it, or the compound may be enclosed in a wrapper which will prevent the rubber from sticking to the die but which may not have sufficient tensile strength to serve for drawing the compound through the die. This process has the advantage of doing away with the necessity of using a relatively expensive wrapping material where an uncovered sponge rubber body is desired. It further permits me to obtain such a body which does not show the thread marks that would appear where heavy cloth is used to wrap the rubber.

It is to be understood that the die may be of any desired shape and is to be heated as explained in the aforesaid Wedlock patent.

What I claim is:

A continuous process of molding sponge rubber articles which comprises the steps of forming a strip of sponge rubber compound with a substantially non-extensible member embedded therein and drawing the strip through a heated die by putting tension on the embedded member whereby a strain is exerted on the unexpanded compound to push the softened and expanded rubber through the die.

BENJAMIN B. FELIX.